UNITED STATES PATENT OFFICE.

MAX BUCHNER, OF MANNHEIM, GERMANY, ASSIGNOR TO C. F. BOEHRINGER & SOEHNE, OF MANNHEIM-WALDHOF, GERMANY, A FIRM.

MATERIAL FOR COATING AND IMPREGNATING PURPOSES.

1,165,222.  Specification of Letters Patent.  Patented Dec. 21, 1915.

No Drawing.  Application filed August 17, 1911.  Serial No. 644,661.

*To all whom it may concern:*

Be it known that I, MAX BUCHNER, citizen of Germany, residing at Prinz-Wilhelm strasse 6, Mannheim, Germany, have invented certain new and useful Improvements in Materials for Coating and Impregnating Purposes; and I do hereby declare the following to be a full, clear, and exact description of the invention, such as will enable others skilled in the art to which it appertains to make and use the same.

This invention relates to highly chlorinized or chlorinated derivatives of fluent and fusible organic bodies of a more or less oleaginous nature such as oils, fats, waxes, resins and mineral hydrocarbons. By "highly chlorinized or chlorinated derivatives" I mean such as contain at least 30% of chlorin. These products are useful for coating and other purposes and are obtained by the vigorous action of chlorin on the starting material as by working at an elevated temperature and when necessary under pressure and with the use of suitable solvents in such manner as to introduce large amounts of chlorin into such material; under these conditions resinified products result which can contain as much or more than 70% of chlorin. These products, I have found, possess one attribute in common, viz., their stability and extraordinary indifference to chemical reagents. For instance, the highly chlorinized vegetable oils give products which can be painted and dried on a surface, and the coating will withstand the action of warm 20-30% sulfuric or hydrochloric acid, likewise the action of such gases as nitric acid, hydrofluoric acid, or chlorin, be they cold or warm. Similar properties are exhibited by products obtained by highly chlorinizing resins and resinous bodies as for instance colophonium or the products of distillation of resins as for instance resinous oils. Lastly, I have found that the products obtained by this treatment of mineral or petroleum oil or of the products of distillation thereof, viz., ligroin, paraffin, and of the mineral waxes ozocerite and ceresin, exhibit this property of resistibility to a still higher degree inasmuch as they are impervious not only to the action of cold and hot acids, but also to that of cold and warm concentrated alkali solutions. These properties make the products in question particularly valuable for purposes of coating, painting, varnishing and impregnating. For this purpose they may either be employed as such or, and most advantageously they may be dissolved in volatile solvents such as carbon tetrachorid, ether, benzin, alcohol, oil of turpentine, chloroform, etc., to form varnishes or paints or other liquid coating compositions, such solutions being used in various concentrations according to the nature of the substances employed. One can also mix these products with other known varnishes or coating substances such as linseed oil, dammar varnish, copal varnish, other artificial or natural resins and oils.

To both the simple and the mixed solutions pigments of all kinds such as iron oxid, zinc white, litharge, red oxid of lead, etc., may be added or they can be mixed with organic dyes or with poisonous chemicals as phenol, Schweinfurt green, etc. The impregnation or coating is carried out according to one of the known methods.

These new coating and impregnating materials can be used on metals, fabrics, wood, leather, etc. Apart from their great resistibility to chemical action they impart to the articles thus treated the property of a good electric insulator.

Let it be noted, that in the following claims the term "oleaginous material" is to be taken in the broad sense and to include all mineral vegetable and animal fats, oils, resins, and waxes.

What I claim as new is:

1. As a new substance for coating and impregnating purposes a stable highly chlorinated oleaginous material, said product containing at least 30 per cent. of chlorin and being in combination with a suitable volatile organic solvent.

2. As a new substance for coating and impregnating purposes a stable highly chlorinated oleaginous material, said product containing at least 30 per cent. of chlorin and being in combination with a pigment and a suitable volatile organic solvent.

3. As a new substance for coating and impregnating purposes a stable highly chlorinated oleaginous material, said product containing at least 30 per cent. of chlorin and being in combination with another painting and coating substance and with a suitable volatile organic solvent.

4. As a new substance for coating and impregnating purposes, a stable highly chlorinated unoxidized oleaginous material, containing at least 30 per cent. of chlorin and being in combination with a suitable volatile organic solvent.

5. As a new substance for coating and impregnating purposes a stable highly chlorinated mineral oil material containing at least 30 per cent. chlorin, said material being in combination with a suitable volatile organic solvent.

6. As a new substance for coating and impregnating purposes a stable highly chlorinated mineral oil material containing at least 30 per cent. of chlorin, said material being in combination with a pigment and a suitable volatile organic solvent.

7. As a new substance for coating and impregnating purposes a stable highly chlorinated mineral oil material containing at least 30 per cent. of chlorin, said material being in combination with other painting and coating substances and a suitable volatile organic solvent.

In testimony whereof I hereunto affix my signature in the presence of two witnesses.

Dr. MAX BUCHNER.

Witnesses:
 JOSEPH PFEIFFER,
 S. H. SHANK.